United States Patent
Hofmann et al.

(10) Patent No.: US 7,185,123 B2
(45) Date of Patent: Feb. 27, 2007

(54) METHOD AND APPARATUS FOR ALLOCATING BANDWIDTH ON A TRANSMIT CHANNEL OF A BUS

(75) Inventors: Richard Gerard Hofmann, Cary, NC (US); Mark Michael Schaffer, Cary, NC (US)

(73) Assignee: Qualcomm Incorporated, San Diego, CA (US)

( * ) Notice: Subject to any disclaimer, the term of this patent is extended or adjusted under 35 U.S.C. 154(b) by 225 days.

(21) Appl. No.: 10/942,291

(22) Filed: Sep. 15, 2004

(65) Prior Publication Data

US 2006/0136615 A1   Jun. 22, 2006

(51) Int. Cl.
    *G06F 13/00* (2006.01)
(52) U.S. Cl. .............................. 710/34; 710/45; 710/48; 710/105
(58) Field of Classification Search ................ 710/105, 710/310, 262, 34, 45, 48; 714/748, 749
    See application file for complete search history.

(56) References Cited

U.S. PATENT DOCUMENTS

| | | | | |
|---|---|---|---|---|
| 5,386,532 A | * | 1/1995 | Sodos | 710/22 |
| 5,388,237 A | * | 2/1995 | Sodos | 710/22 |
| 5,794,072 A | * | 8/1998 | Nomura et al. | 710/40 |
| 5,812,772 A | * | 9/1998 | Hasegawa | 709/202 |
| 5,937,199 A | * | 8/1999 | Temple | 710/262 |
| 6,295,573 B1 | * | 9/2001 | Bailey et al. | 710/260 |
| 6,687,796 B1 | * | 2/2004 | Laine et al. | 711/149 |
| 6,748,442 B1 | * | 6/2004 | Keller | 709/232 |
| 7,013,419 B2 | * | 3/2006 | Kagan et al. | 714/749 |
| 2003/0093453 A1 | | 5/2003 | Lym et al. | |
| 2004/0114136 A1 | | 6/2004 | Dietz et al. | |

OTHER PUBLICATIONS

Morris Mano, "Computer System Architecture", Prentice-Hall Inc., 2nd Ed., pp. 428-429 and 434-435.*

* cited by examiner

*Primary Examiner*—Khanh Dang
(74) *Attorney, Agent, or Firm*—Nicholas J. Pauley; Thomas Rouse

(57) ABSTRACT

A processing system and method of communicating within the processing system is disclosed. The processing system may include a bus having a transmit channel, a receiving component, and a sending component configured to broadcast a payload to the receiving component over the transmit channel, interrupt the broadcast of the payload to signal a new bus operation to the receiving component over the transmit channel, and resume the broadcast of the payload over the transmit channel. The processing system may include an algorithm that prevents small payloads from being interrupted to initiate a new bus operation. The algorithm may also be used to limit the number of times a single write operation may be interrupted to initiate a new bus operation.

10 Claims, 4 Drawing Sheets

METHOD AND APPARATUS FOR ALLOCATING BANDWIDTH ON A TRANSMIT CHANNEL OF A BUS

BACKGROUND

1. Field

The present disclosure relates generally to processing systems employing a bus architecture, and more specifically, to methods and apparatus for allocating bandwidth on a transmit channel of a bus.

2. Background

Computers have revolutionized the electronics industry by enabling sophisticated processing tasks to be performed with just a few strokes of a keypad. These sophisticated tasks involve an incredibly high number of complex components that communicate with one another in a fast and efficient manner using a bus. A bus is a channel or path between components in a computer.

A typical computer includes a microprocessor with system memory. A system bus may be used to support communications between the two. In addition, there may also be other peripheral buses which are used to transfer data to various peripherals. In some cases, there may also be a configuration bus which is used for the purpose of programming various resources. Bridges may be used to efficiently transfer data between the higher and lower bandwidth buses, as well as provide the necessary protocol translation.

Many buses resident in a computer have traditionally been implemented as shared buses. A shared bus provides a means for any number of components to communicate over a common path or channel. In recent years, shared bus technology has been replaced to a large extent by point-to-point switching connections. Point-to-point switching connections provide a direct connection between two components on the bus while they are communicating with each other. Multiple direct links may be used to allow several components to communicate at the same time.

Conventional bus design includes independent and separate read, write and one or more address channels. A microprocessor, for example, can read or write to system memory by placing an address location on the address channel and sending the appropriate read/write control signal. When the microprocessor writes data to system memory, it sends the data over the write channel. When the microprocessor reads data from system memory, it receives the data over the read channel.

Although this particular bus structure provides a fairly standardized way to communicate between components of a computer, it requires a number of dedicated channels. These channels require driver, receiver and buffer circuits, all which consume power. In integrated circuit applications, these channels occupy valuable chip area. Accordingly, there is a need in the art for a simplified bus structure.

SUMMARY

In one aspect of the present invention, a processing system includes a bus having a transmit channel, a receiving component, and a sending component configured to broadcast a payload to the receiving component over the transmit channel, interrupt the broadcast of the payload to signal a new bus operation to the receiving component over the transmit channel, and resume the broadcast of the payload over the transmit channel.

In another aspect of the present invention, a processing system includes a bus having a transmit channel, a receiving component, and a sending component configured to broadcast a payload to the receiving component over the transmit channel, interrupt the broadcast of the payload for each new bus operation initiated during the payload broadcast up to a maximum number of interrupts, signal a different one of the new bus operations to the receiving component over the transmit channel during each of the interrupts, and resume the broadcast of the payload over the transmit channel following each of the interrupts.

In yet another aspect of the present invention, a processing system includes a bus having a transmit channel, a receiving component, and a sending component configured to broadcast a payload to the receiving component over the transmit channel, initiate a new bus operation during a time period following the beginning of the payload broadcast, allow the payload to be broadcasted without interruption during the time period, interrupt the broadcast of the payload to signal the new bus operation to the receiving component over the transmit channel following the time period if the payload broadcast extends beyond the time period, and resume the broadcast of the payload if interrupted.

In still another embodiment of the present invention, a processing system includes a bus having a transmit channel, a receiving component, and a sending component having means for broadcasting a payload to the receiving component over the transmit channel, means for interrupting the broadcast of the payload to signal a new bus operation to the receiving component over the transmit channel, and means for resuming the broadcast of the payload.

In a further aspect of the present invention, a method of communicating between a sending component and a receiving component over a bus having a transmit channel, the method including broadcasting from the sending component a payload to the receiving component over the transmit channel, interrupting the broadcast of the payload to signal a new bus operation to the receiving component over the transmit channel, and resuming the broadcast of the payload from the sending component to the receiving component over the transmit channel.

In yet a further aspect of the present invention, a method of communicating between a sending component and a receiving component over a bus having a transmit channel, the method includes broadcasting from the sending component a payload to the receiving component over the transmit channel, interrupting the broadcast of the payload for each new bus operation initiated by the sending component during the payload broadcast up to a maximum number of interrupts, signaling by the sending component a different one of the new bus operations to the receiving component over the transmit channel during each of the interrupts, and resuming the broadcast of the payload by the sending component to the receiving component over the transmit channel following each of the interrupts.

In still a further aspect of the present invention, a method of communicating between a sending component and a receiving component over a bus having a transmit channel, the method including broadcasting a payload from the sending component to the receiving component over the transmit channel during first and second time periods, initiating a new bus operation during the first time period, the first time period following the beginning of the payload broadcast, interrupting the broadcast of the payload to signal the new bus operation by the sending component to the receiving component over the transmit channel during the second time period, the second time period following the first time period, and resuming the broadcast of the payload.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
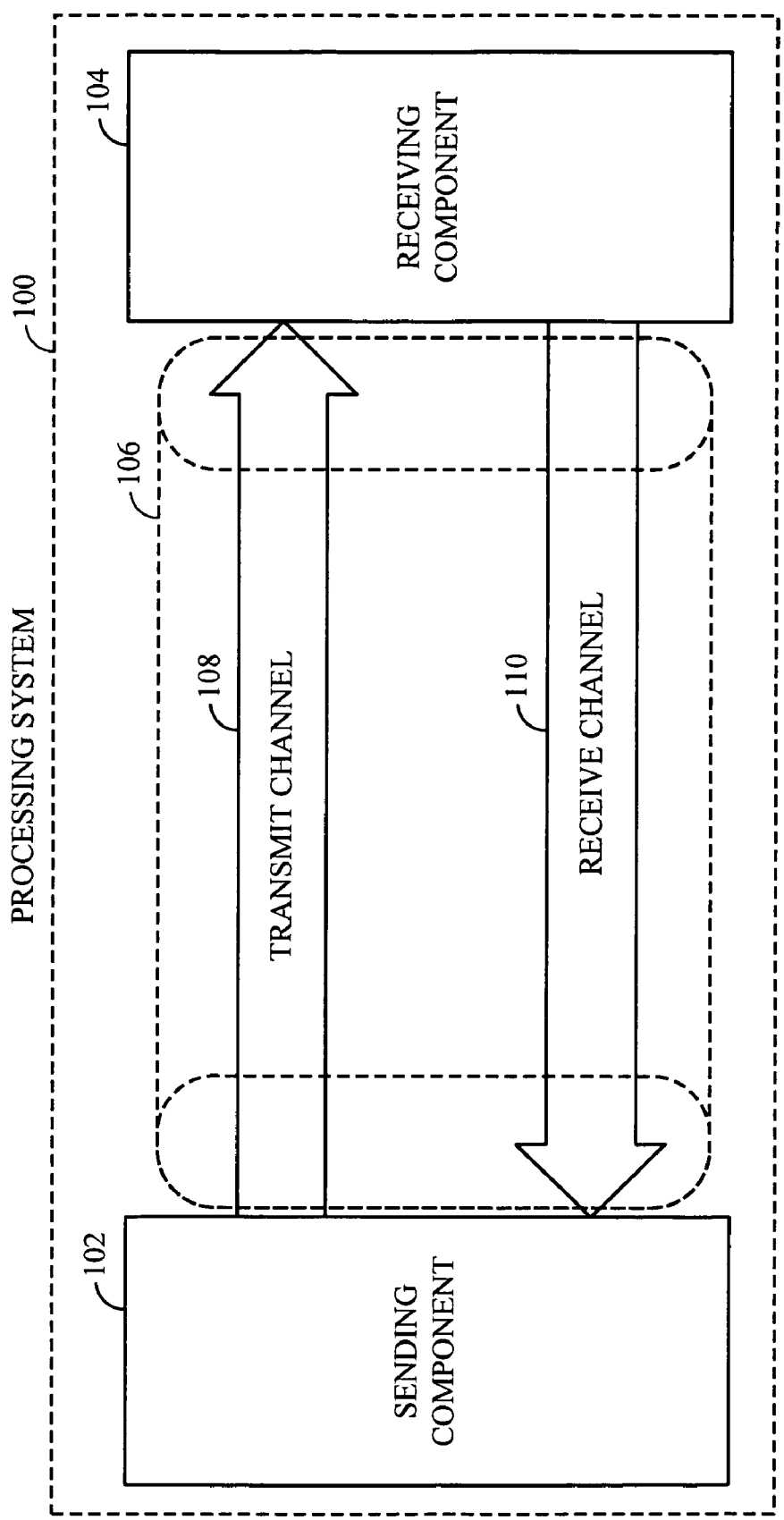
FIG. 1 is a conceptual block diagram illustrating an example of a point-to-point connection between two components in a processing system over a bus.

FIG. 1 is a conceptual block diagram illustrating an example of a point-to-point connection over a bus between two components in a processing system. The processing system 100 may be a collection of components that cooperate to perform one or more processing functions. Typically, the processing system will be a computer, or resident in a computer, and capable of processing, retrieving and storing information.

The processing system 100 is shown with a sending component 102 in communication with a receiving component 104 over a bus 106. In one embodiment of the processing system 100, the bus 106 is a dedicated bus between the sending component 102 and the receiving component 104. In another embodiment of the processing system 100, the sending component 102 communicates with the receiving component 104 with a point-to-point connection over the bus 106 through a bus interconnect (not shown). These embodiments of the bus are provided to facilitate a thorough explanation of the invention with the understanding that the invention is not limited to a dedicated bus or point-to-point switching connection, but may be applied to any type of bus technology including, by way of example, a shared bus.

The sending component 102 may be any type of bus mastering component including, by way of example, a microprocessor, a digital signal processor (DSP), a direct memory access controller, a bridge, a programmable logic component, discrete gate or transistor logic, or any other information processing component.

The receiving component 104 may be any storage component, including, by way of example, registers, memory, a bridge, an interconnect, or any other component capable of retrieving and storing information. The storage capacity at each address location of the receiving component may vary depending on the particular application and the overall design constraints. For the purposes of explanation, the receiving component will be described with a storage capacity of 1-byte per address location.

The complexity of the bus 106 may be reduced by eliminating the address channel that is used in conventional bus structures. The elimination of the address channel may be achieved by redefining the write channel as a "transmit channel" 108. The transmit channel 108 may be used as a generic medium for broadcasting information between the sending component 102 and the receiving component 104 in a time division multiplexed fashion. This information may include read and write address information, transfer qualifiers, write byte enables, data to be written to the receiving component ("write data"), or any other bus related information. A receive channel 110 may be used to broadcast data read from the receiving component 104 ("read data") to the sending component 102.

The term "transfer qualifier" refers to a parameter that describes an attribute of a read operation, write operation, or any other bus related operation. An example of a transfer qualifier is a signal indicating the size of the payload for a read or write operation. The term "payload" refers to the data associated with a single read or write operation. If the payload is multiple bytes, then the receiving component 104 may write to, or read from, a block of sequential address locations beginning with the address location broadcast on the transmit channel 108 in connection with that operation.

The "byte write enable" may be used to indicate which byte lanes on the transmit channel 108 will be used to broadcast the payload for a write operation. By way of example, a 2-byte payload broadcast on a 32-bit transmit channel 108 may use two of the four byte lanes. The byte write enable may be used to indicate to the receiving component 102 which of the two byte lanes on the transmit channel 108 will be used to broadcast the payload for a write operation.

The sending component 102 may write to the receiving component 104 by broadcasting an address location, transfer qualifiers, write byte enables, and the payload over the transmit channel 108. The size of the payload, or the number of clocks required to broadcast the payload over the transmit channel 108, may be determined by the sending component 102, and may be either fixed by implementation or programmable. In most cases, it is desirable to broadcast large payloads across the transmit channel 108 to take advantage of bursting protocols which often leads to a higher overall efficiency of the available bandwidth. However, large payloads have the disadvantage of delaying the presentation of the next address location for a read operation on the transmit channel 108 to the receiving component 104. This may increase the latency for subsequent higher priority read operations that the sending component 102 may have pending.

The sending component 102 may be configured to allocate address information and payload bandwidth on the transmit channel 108 to help reduce this latency and increase the performance of the processing system 100. More specifically, the sending component 102 may be configured to interrupt the broadcast of a large payload on the transmit channel 108 to initiate a high priority read operation by interleaving the address location and transfer qualifiers for the read operation within the payload. The payload for the high priority read operation may then be broadcast on the receive channel 110 in parallel with the remaining portion of the payload for the write operation being broadcast on the transmit channel 108.

The sending component 102 may also be configured to interrupt the broadcast of a large payload on the transmit channel 108 to facilitate the pipelining of subsequent write operations across the transmit channel 108. In the case where the receiving component 104 is a memory controller configured to access off-chip memory, there may be a several clock cycle delay from the time the address location is presented to the off-chip memory until the payload can be written to the memory. Thus, by allowing the address location, transfer qualifiers and write byte enables for a write operation to be broadcast across the transmit channel 108 before the completion of the broadcast of the current payload, the receiving component 104 may be able to more efficiently pipeline write operations.

The various concepts described thus far may be implemented using any number of protocols. In the detailed description to follow, an example of a bus protocol will be presented. This bus protocol is being presented to illustrate the inventive aspects of a processing system, with the understanding that such inventive aspects may be used with any suitable protocol. The basic signaling protocol for the transmit channel is shown below in Table 1. Those skilled in the art will readily be able to vary and/or add signals to this protocol in the actual implementation of the bus structure described herein.

TABLE 1

| Signal | Definition | Driven By |
|---|---|---|
| Clock | The reference clock signal | Processing System |
| Transmit Valid | Valid information is being broadcast on the transmit channel | Sending component |
| Transmit Type (2:0) | Indicates the type of information being broadcast on the transmit channel | Sending Component |
| Transmit Transfer Ack | Indicates receiving component is ready to receive a broadcast on the transmit channel | Receiving Component |
| Transmit Channel | Channel driven by the sending component to broadcast information to the receiving component | Sending Component |

The same signaling protocol may be used for the receive channel as shown below in Table 2.

TABLE 2

| Signal | Definition | Driven By |
|---|---|---|
| Clock | The reference clock signal | System |
| Receive Valid | Valid information is being broadcast on the receive channel | Receiving Component |
| Receive Type (2:0) | Indicates the type of information being broadcast on the receive channel | Receiving Component |

TABLE 2-continued

| Signal | Definition | Driven By |
|---|---|---|
| Receive Transfer Ack | Indicates sending component is ready to receive a broadcast on the receive channel | Sending Component |
| Receive Channel | Channel driven by the receiving component to broadcast information to the sending component | Receiving Component |

The definition of the Type field used in this signaling protocol is shown in Table 3.

TABLE 3

| Type Value | Definition |
|---|---|
| 000 | Reserved |
| 001 | Valid Write Address Location |
| 010 | Valid Write Transfer Qualifiers |
| 011 | Valid Write Data |
| 100 | Reserved |
| 101 | Valid Read Address Location |
| 110 | Valid Read Transfer Qualifiers |
| 111 | Valid Read Data |

Figure 2:
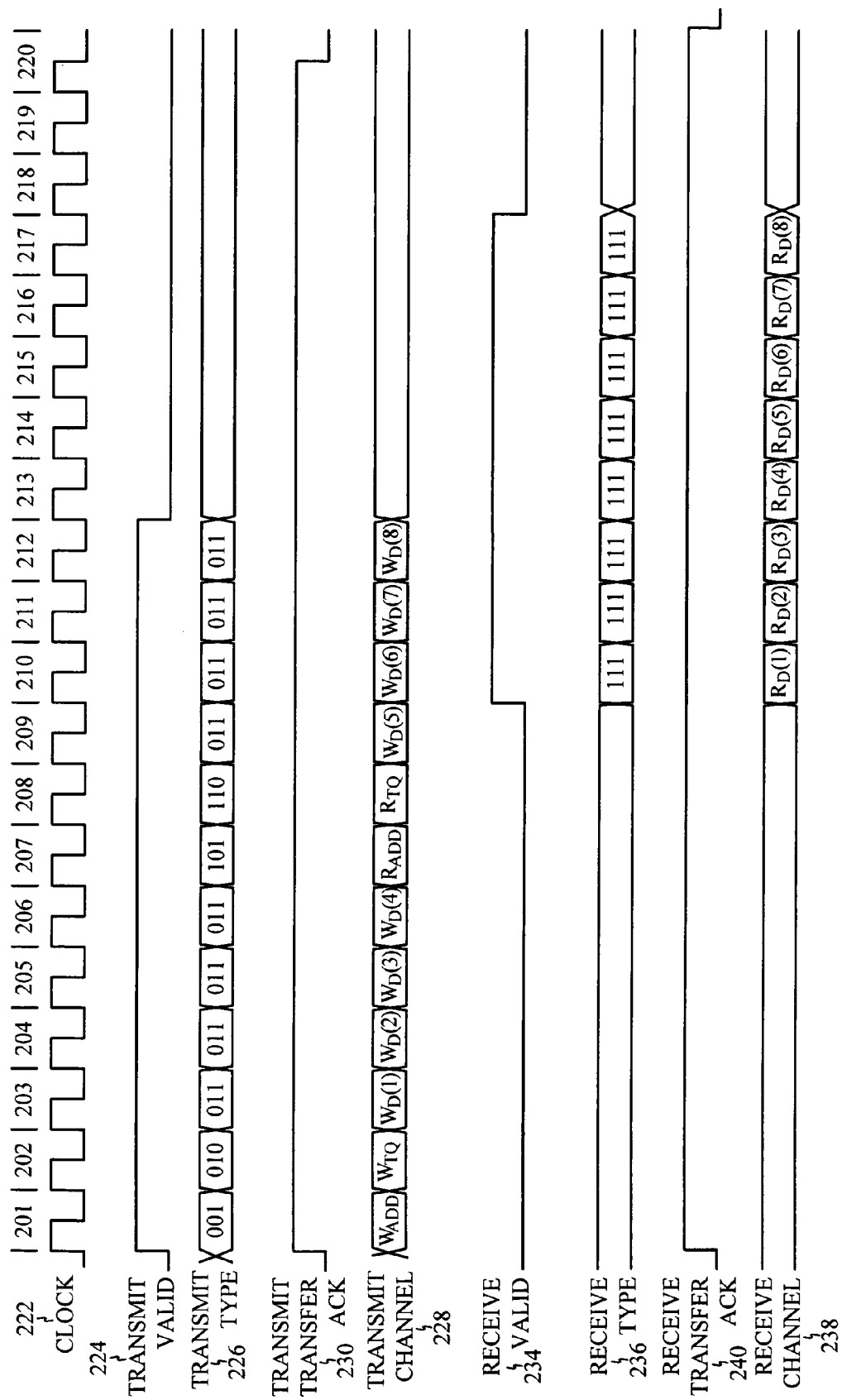
FIG. 2 is a timing diagram illustrating a write operation between two components in a processing system over a bus being interrupted to initiate a read operation.

FIG. 2 is a timing diagram illustrating how a write operation may be interrupted to initiate a read operation. In this example, the transmit channel is 64 bits wide and the payload for the write operation is 64 bytes. This requires eight clock cycles to broadcast the payload over the transmit channel. Normally, a read operation could not be initiated until the broadcast of the payload for the write operation was complete. However, with the method of allocating bandwidth on the transmit channel described thus far, the address location for the read operation may be interleaved with the payload for the write operation as soon as the read operation is initiated by the sending component, thereby reducing the read latency and improving the utilization of the transmit and receive channels.

Referring to FIG. 2, a Clock 222 may be used to synchronize communications between the sending component and the receiving component. A write operation may be initiated by the sending component during the first clock cycle 201. This may be achieved by asserting the Transmit Valid signal 224 and setting the Transmit Type field 226 to signal a broadcast of a valid write address location for a write operation. At the same time, the address location may be broadcast over the Transmit Channel 228 to the receiving component. The receiving component detects the assertion of the Transmit Valid signal 224, and determines from the Transmit Type field 226 that the address location broadcast on the Transmit Channel 228 is a valid address for a write operation. In response, the receiving component stores the address location in its address queue. The receiving component may also assert a Transmit Transfer Ack signal 230 indicating that it has received the broadcast.

The broadcast of the address location may be followed by a broadcast of transfer qualifiers for the write operation in the second clock cycle 202. The sending component may alert the receiving component of this broadcast by keeping the Transmit Valid signal 224 asserted and changing the Type field 226 appropriately. The transfer qualifiers may include signaling indicating that the payload for the write operation is 64 bytes. In this case, the transfer qualifiers may include write byte enables indicating that all byte lanes will be used to broadcast the payload. Alternatively, the write byte enables may be broadcast using sideband signaling. The receiving component detects the assertion of the Transmit Valid signal 224, and determines from the Transmit Type field 226 that the transfers qualifiers broadcast on the Transmit Channel 228 are valid for the write operation. The receiving component may determine from the transfer qualifiers that, among other things, the payload will be broadcast over eight clock cycles, and will be written to a block of 64 sequential address locations beginning with the address location stored in its address queue.

Assuming that there are no other read or write operations of higher priority, the broadcast of the payload may begin in the third clock cycle 203 with an 8 byte payload data beat utilizing all byte lanes of the Transmit Channel 228. The sending component may alert the receiving component of the payload broadcast by keeping the Transmit Valid signal 224 asserted and changing the Transmit Type field 226 accordingly. The receiving component detects the assertion of the Transmit Valid signal 224, and determines from the Transmit Type field 226 that valid write data is being broadcast on the Transmit Channel 228. In response, 8 bytes may be written to the receiving component.

In this example, the sending component continues to broadcast the payload 8 bytes at a time over the next three clock cycles. During the seventh clock cycle 207, the payload for the write operation is interrupted for a high priority read operation. The Transmit Valid signal 224 is asserted and the Transmit Type field 226 set to signal a broadcast of a valid read address location for a read operation. At the same time, the address location may be broadcast over the Transmit Channel 228 to the receiving component. The receiving component detects the assertion of the Transmit Valid signal 224, and determines from the Transmit Type field 226 that the payload broadcast for the write operation has been suspended in favor of an address location for a read operation. In response, the receiving component stores the address location in its address queue. The receiving component may also assert the Transmit Transfer Ack signal 230 indicating that it has received the broadcast.

The broadcast of the address location may be followed by a broadcast of transfer qualifiers for the read operation in the eighth clock cycle 208. The sending component may alert the receiving component of this broadcast by keeping the Transmit Valid signal 224 asserted and changing the Transmit Type field 226 appropriately. The transfer qualifiers may include signaling indicating that the payload for the read operation is also 64 bytes. The receiving component detects the assertion of the Transmit Valid signal 224, and determines from the Transmit Type field 226 that the transfer qualifiers broadcast on the Transmit Channel 228 are valid for the read operation. Assuming that the Receive Channel 240 is 8 bytes wide, the receiving component determines from the transfer qualifiers that, among other things, the payload will be broadcast over eight clock cycles, and will be read from a block of 64 sequential address locations beginning with the address location stored in its address queue.

The sending component may resume broadcasting the payload for the write operation on the Transmit Channel 228 at the beginning of the ninth clock cycle 209, completing the broadcast at the end of the twelfth clock cycle 212. During each of these four clock cycles, the sending component alerts the receiving component of the payload broadcast by keeping the Transmit Valid signal 224 asserted and setting the Transmit Type field 226 to signal valid write data. The receiving component detects the assertion of the Transmit Valid signal 224 in each clock cycle, and determines from the Transmit Type field 226 that valid write data is being broadcast on the Transmit Channel 228. At the end of each clock cycle, the 8 bytes of the payload on the Transmit Channel 228 are written to the receiving component until the entire broadcast of the payload is complete at the end of the twelfth clock cycle 212.

At the same time the sending component resumes broadcasting the payload for the write operation during the ninth clock cycle 209, the receiving component begins accessing the payload for the read operation. Due to the read latency of the receiving component, a one clock cycle delay may be experienced before the payload becomes available. Once the payload (or at least the first 8 bytes of the payload) becomes available at the beginning of the tenth clock cycle 210, the receiving component may assert the Receive Valid signal 234 and set the Receive Type field 236 signaling valid read data on the Receive Channel 238. The receiving component may then begin broadcasting the payload for the read operation over the Receive Channel 238 to the sending component. The Receive Valid signal 234 and the Receive Type field 236 setting will be maintained through the entire broadcast of the payload for the read operation, which in this case, will extend over eight clock cycles beginning with the tenth clock cycle 210 and completing with the end of the seventeenth clock cycle 217. As long as the Receive Transfer Ack signal 240 at the sending component remains asserted, the payload broadcast for the read operation may be completed in this time frame.

If the read operation had not been initiated during the broadcast of the payload for the write operation, the return of the payload for the read operation would not have started until the fourteenth clock cycle 214. Thus, the latency for the read operation in the above example has been reduced by four clock cycles as compared to conventional techniques.

The benefits of reducing the read latency could be offset under some conditions by the increase in delay of the payload broadcast for the write operation. To optimize performance across the bus, the sending component may employ an algorithm to prevent new read operations initiated by the sending component from interrupting the broadcast of small payloads, thereby controlling the maximum read latency seen in the processing system. The algorithm may also be used to limit the number of times a single payload broadcast over the transmit channel may be interrupted to initiate a new read operation, thereby controlling the maximum time it takes to broadcast the payload for the write operation.

The algorithm may be implemented as part of the sending component in either hardware, software, firmware, or any combination thereof. By way of example, the sending component may include a microprocessor capable of initiating read and write operations, and a bus interface implemented in hardware and incorporating the algorithm. Alternatively, the algorithm may be software configured to run on the microprocessor. In another embodiment, the sending component may include a DSP and the algorithm may be an embedded software layer. In some embodiments of the processing system, the algorithm may be a stand-alone entity separate and apart from the sending component. For the purposes of this disclosure, the term "sending component" is intended to include the algorithm regardless of the algorithm's physical location within the processing system.

Figure 3:
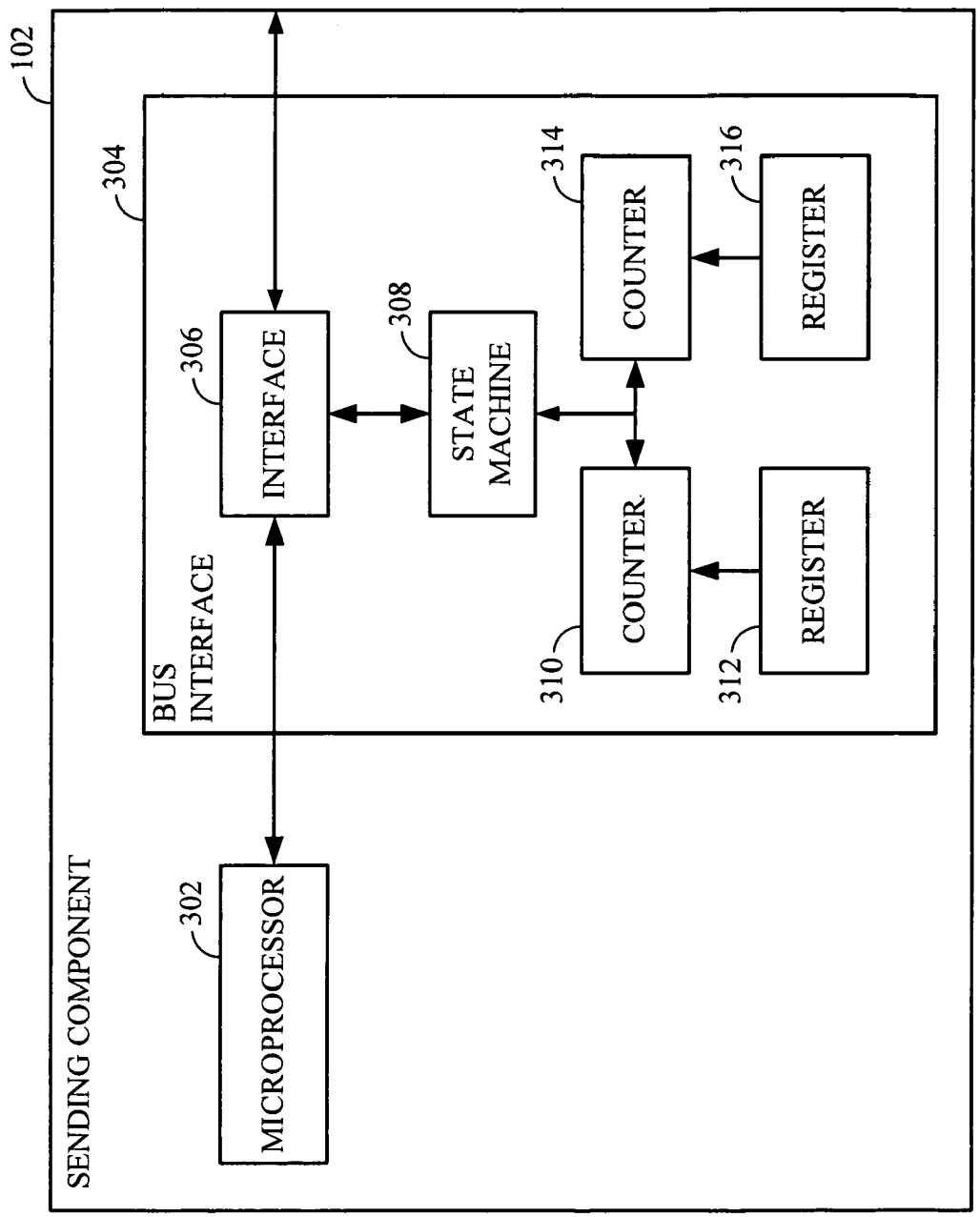
FIG. 3 is a conceptual block diagram illustrating an implementation of an algorithm that controls the interrupt function of a write operation between two components in a processing system over a bus.

FIG. 3 is a high level block diagram illustrating an example of a sending component implementing the algorithm. The sending component 102 may include a microprocessor 302 and a hardware implemented bus interface 304. The bus interface 304 may include an interface 306 between the microprocessor 302 and the bus 106. The algorithm may be implemented in the bus interface 304 with a state machine 308 that prevents the sending component from interrupting the broadcast of small payloads to initiate new bus operations. A programmable value in a register 312 represents the minimum number of clock cycles that the payload must be broadcast on the bus 106 before it can be interrupted to signal a new bus operation to the receiving component. The value may be loaded into a counter 310 by the state machine 308 when a write operation is initiated and counted down with each clock cycle of the payload broadcast. During the time the counter contains a non-zero value, the payload broadcast cannot be interrupted to signal a new bus operation. The bus interface 304 will delay signaling all new bus operations until the counter reaches zero, or the payload broadcast completes.

The algorithm may also employ a second register 316, which may be used to limit the number of times a payload broadcast can be interrupted to signal a new bus operation to the receiving component. A value may be programmed into the second register 316 to indicate the maximum number of interrupts during a single payload broadcast. The value may be loaded into a second counter 314 by the state machine 308 when a write operation is initiated and counted down each time the payload broadcast is interrupted. During the time the second counter 314 contains a non-zero value, the payload broadcast may be interrupted to signal a new bus operation. Once the counter reaches zero, the bus interface 304 will delay signaling all new bus operations until the current payload broadcast is complete.

Figure 4:
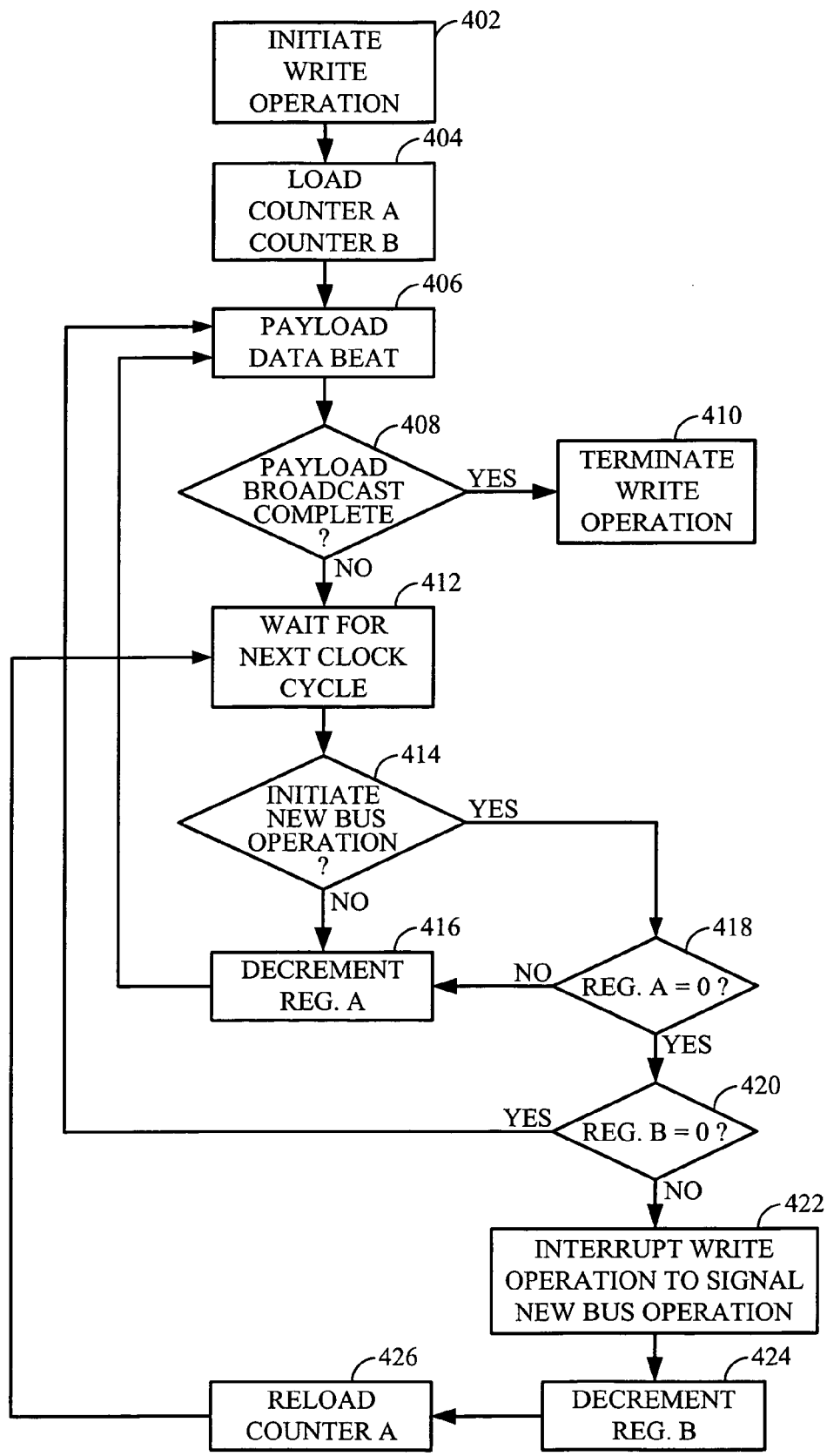
FIG. 4 is a flow diagram illustrating the function of an algorithm that controls the interrupt function of a write operation between two components in a processing system over a bus.

FIG. 4 is a flow diagram illustrating the functionality of the algorithm. In step 402, the sending component initiates a write operation by broadcasting an address location and transfer qualifiers to the receiving component over the transmit channel. At the same time, or shortly thereafter, the sending component loads two counters in step 404. The first counter, which will be referred to as "Counter A," may be loaded with a value equal to the minimum number of clock cycles, or the minimum number of payload data beats, that must occur after the beginning of a payload broadcast before the sending component will interrupt the broadcast to signal a new bus operation. The second counter, which will be referred to as "Counter B," may be loaded with a value equal to the maximum number of times the sending component will interrupt a single payload broadcast to signal a new bus operation. Once the receiving component acknowledges the broadcast of the address location and transfer qualifiers for the write operation, the sending component may begin broadcasting the payload to the receiving component. This may be achieved by broadcasting a payload data beat over the transmit channel in step 406. In the embodiment of the processing system described thus far, the payload data beat includes 8 bytes broadcast utilizing all byte lanes of the transmit channel.

The sending component determines whether the payload broadcast is complete in step 408, and if so, terminates the write operation in step 410. Conversely, if the payload broadcast is not complete, the sending component waits in step 412 for the next clock cycle. When this occurs, the sending component determines whether a new bus operation is required in step 414. If the sending component determines that a new bus operation is not required, then it decrements the value in Counter A in step 416 and broadcasts another payload data beat in step 406. If, on the other hand, the sending component determines that a new bus operation is required in step 414, then the value in Counter A is checked to see if it has reached zero in step 418. If the value in Counter A is a non-zero value, then the broadcast of the payload over the transmit channel will not be interrupted to signal a new bus operation to the receiving component. In that case, the new bus operation will be delayed. The value in Counter A will be decremented in step 416, and another payload data beat will be broadcast in step 406. If the value in Counter A is zero, then the sending component may interrupt the payload broadcast to signal a new bus operation to the receiving component, provided that the payload broadcast has not already been interrupted the maximum number of times allowed by the sending component.

In step 420 the sending component checks to see if the value in Counter B has reached zero. If the value in Counter B is zero, then the payload broadcast has been interrupted the maximum number of times allowed by the sending component. In that case, the new bus operation will be delayed in favor of another payload data beat in step 406. If, on the other hand, the value in Counter B is a non-zero value, then the payload broadcast will be interrupted in step 422 to signal a new bus operation to the receiving component. The sending component decrements the value in Counter B in step 424, reloads Counter A in step 426, and the broadcasts another payload data beat in step 406. Counter A may be reloaded with the same value in the register, thus requiring the same delay between interrupts. Alternatively, Counter A may be loaded with some other value. In at least one embodiment, Counter A may be loaded with zero indicating that the payload broadcast may be interrupted consecutive clock cycles up to the maximum amount set by the sending component after the initial delay from the beginning of the payload broadcast.

The flow diagram of FIG. 4 describes an algorithm which decrements Counter A after every payload data beat until Counter A reaches zero. This approach ensures that the payload is not interrupted until a minimum amount of the data is broadcast. Alternatively, the it may be desirable to limit the maximum time a bus operation will be delayed following the beginning of a payload broadcast. This may be achieved with an algorithm that decrements Counter A every clock cycle rather than every payload data beat. With this approach, the bus operation will not be unduly delayed if the Transmit Transfer Ack is deasserted by the receiving component for any length of time during early portion of the payload broadcast over the transmit channel.

The various illustrative embodiments described in this disclosure refer to interleaving address information and transfer qualifiers with the payload for a write operation. However, these concepts may be extended to other types of bus operations over the transmit channel. By way of example, a TLB invalidate command may be interleaved with the payload. Separate programmable registers may be used for each type of broadcast. Separate programmable registers may allow a different number of interrupts for each type of broadcast. Moreover, by programming a register with a zero value, the interrupt function can be disabled for that particular type of broadcast.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A processing system, comprising:
    a bus having a transmit channel, the transmit channel configured to carry write addresses, write data, and read addresses over the same transmit channel;
    a receiving component; and
    a sending component configured to broadcast a payload to the receiving component over the transmit channel, interrupt the broadcast of the payload for each new bus operation initiated during the payload broadcast up to a maximum number of interrupts, signal a different one of the new bus operations to the receiving component over the transmit channel during each of the interrupts, and resume the broadcast of the payload over the transmit channel following each of the interrupts.

2. The processing system of claim 1 wherein at least one of the new bus operations comprises a read operation.

3. The processing system of claim 1 wherein the maximum number of interrupts is programmable.

4. The processing system of claim 1 wherein the sending component is further configured to delay signaling to the receiving component each of the new bus operations initiated during the payload broadcast that occurs after the payload broadcast has been interrupted the maximum number of times.

5. The processing system of claim 1 wherein the sending component further comprises a counter, the sending component being further configured to load the counter with a value equal to the maximum number of interrupts, decrement the value each time the payload broadcast is interrupted, and complete the payload broadcast without interruption once the value reaches zero.

6. A method of communicating between a sending component and a receiving component over a bus having a transmit channel, the method comprising:
    broadcasting from the sending component a payload to the receiving component over the transmit channel, the transmit channel configured to carry write addresses, write data, and read addresses over the same transmit channel;
    interrupting the broadcast of the payload for each new bus operation initiated by the sending component during the payload broadcast up to a maximum number of interrupts;
    signaling by the sending component a different one of the new bus operations to the receiving component over the transmit channel during each of the interrupts; and
    resuming the broadcast of the payload by the sending component to the receiving component over the transmit channel following each of the interrupts.

7. The method of claim 6 wherein at least one of the new bus operations comprises a read operation.

8. The method of claim 6 wherein the maximum number of interrupts is programmable.

9. The method of claim 6 further comprising delaying signaling by the sending component to the receiving component each of the new bus operations initiated during the payload broadcast that occurs after the payload broadcast has been interrupted the maximum number of times.

10. The method of claim 6 wherein the sending component further comprises a counter, the method further comprising loading the counter with a value equal to the maximum number of interrupts, decrementing the value each time the payload broadcast is interrupted, and completing the payload broadcast without interruption once the value reaches zero.

* * * * *